United States Patent
Markert

(10) Patent No.: US 8,528,439 B2
(45) Date of Patent: Sep. 10, 2013

(54) MANIPULATOR HAVING A COUNTERWEIGHT DEVICE COMPRISING CANTILEVERED ARMS

(75) Inventor: Joachim Markert, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 314 days.

(21) Appl. No.: 13/133,502

(22) PCT Filed: Nov. 8, 2010

(86) PCT No.: PCT/EP2010/067061
§ 371 (c)(1),
(2), (4) Date: Jun. 8, 2011

(87) PCT Pub. No.: WO2011/057990
PCT Pub. Date: May 19, 2011

(65) Prior Publication Data
US 2011/0239806 A1 Oct. 6, 2011

(30) Foreign Application Priority Data
Nov. 12, 2009 (DE) .................... 10 2009 053 032

(51) Int. Cl.
*B25J 17/00* (2006.01)
(52) U.S. Cl.
USPC ......... 74/490.05; 74/490.06; 901/48; 901/50; 901/28
(58) Field of Classification Search
USPC .............. 74/490.01, 490.02, 490.03, 490.04, 74/490.05, 490.06; 901/28, 29, 48, 50
See application file for complete search history.

(56) References Cited

U.S. PATENT DOCUMENTS

| | | | |
|---|---|---|---|
| 5,220,849 A * | 6/1993 | Lande et al. ............... | 74/479.01 |
| 5,257,998 A * | 11/1993 | Ota et al. ...................... | 606/130 |
| 6,354,167 B1 * | 3/2002 | Snow ......................... | 74/490.01 |
| 6,848,333 B2 * | 2/2005 | Lundstrom et al. ........ | 74/490.05 |
| 6,952,977 B2 * | 10/2005 | Bohlken .................... | 74/490.01 |

(Continued)

FOREIGN PATENT DOCUMENTS

| | | |
|---|---|---|
| EP | 0 947 296 A2 | 10/1999 |
| EP | 1 125 696 A1 | 8/2001 |
| EP | 1 419 857 A1 | 5/2004 |
| JP | 11 216697 A | 8/1999 |

OTHER PUBLICATIONS

European Patent Office; Search Report in International Patent Application No. PCT/EP2010/067061 dated Jan. 20, 2011; 4 pages.

(Continued)

*Primary Examiner* — David M Fernstermacher
(74) *Attorney, Agent, or Firm* — Wood, Herron & Evans, LLP

(57) ABSTRACT

The invention relates to a manipulator (1) comprising a plurality of members (12, 14) connected to each other by joints (A1-A6) that can be adjusted by drives (M1-M6), and a counterweight device (15) associated with one of the joints (A1-A6) and comprising a rod (19) coupled to a first member (12) connected to the joint (A1-A6) on one side and connected to a spring device (26) supported on a seat (25) on the other side, said seat being coupled to a second member (14) connected to the joint (A1-A6) by means of at least one bearing arrangement (18), comprising a first bearing component (17) and a second bearing component (16) connected to the second member (14). The seat (25) is connected to the first bearing component (17) by means of at least one cantilevered arm (23, 24).

15 Claims, 3 Drawing Sheets

(56) References Cited

U.S. PATENT DOCUMENTS

Figure 1:
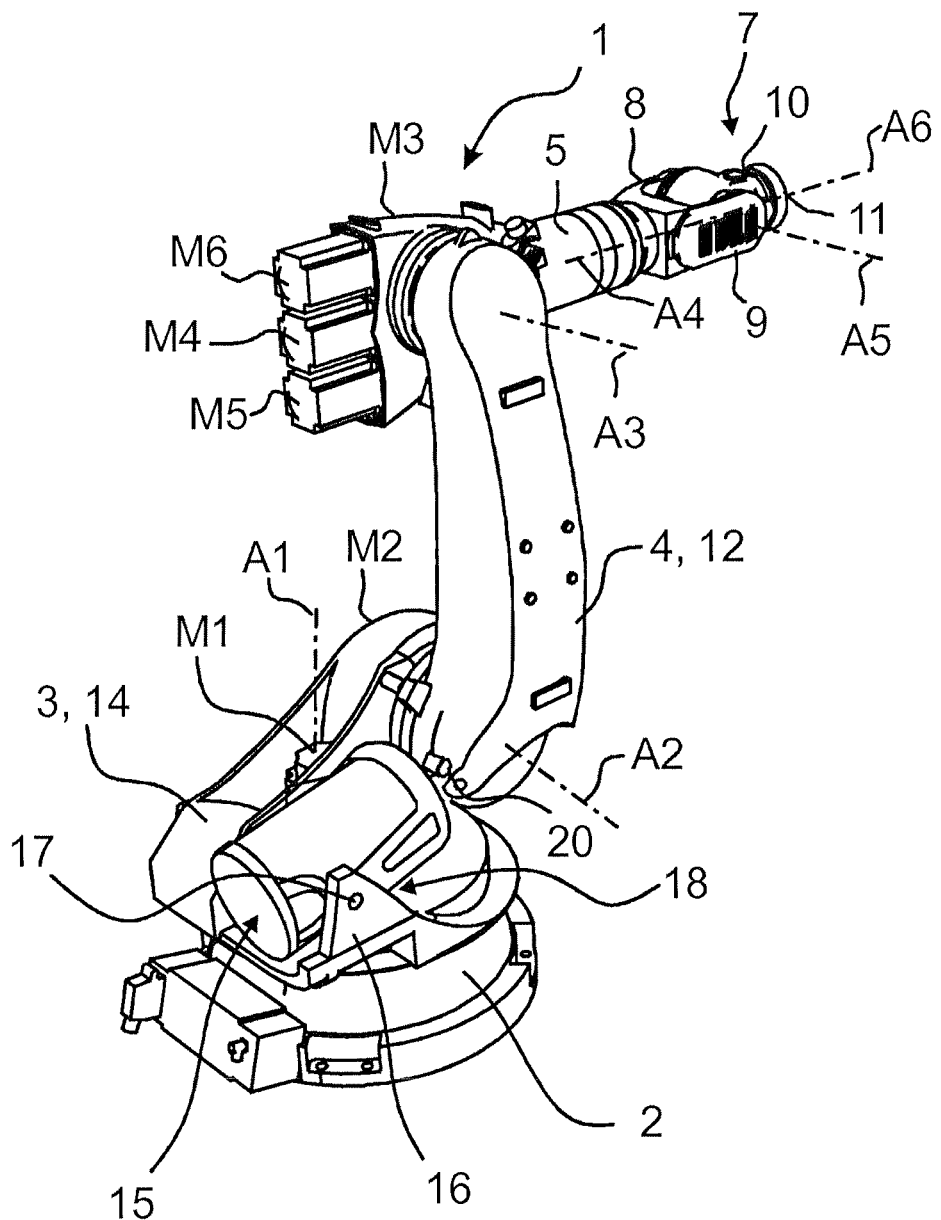

| | | | |
|---|---|---|---|
| 7,102,124 B2 * | 9/2006 | Bacchi et al. | 250/239 |
| 7,837,674 B2 * | 11/2010 | Cooper | 606/1 |
| 7,950,306 B2 * | 5/2011 | Stuart | 74/490.01 |
| 7,971,503 B2 * | 7/2011 | Nakamura | 74/490.01 |
| 7,992,733 B2 * | 8/2011 | Laliberte et al. | 212/279 |
| 8,162,028 B2 * | 4/2012 | Bengtsson et al. | 160/265 |
| 8,327,555 B2 * | 12/2012 | Champ | 33/503 |
| 8,347,756 B2 * | 1/2013 | Bennett et al. | 74/490.04 |
| 8,434,504 B2 * | 5/2013 | Simonette et al. | 134/172 |

OTHER PUBLICATIONS

German Patent Office; Office Action in German Patent Application No. 10 2009 053 032.0 dated Sep. 2, 2010; 3 pages.

* cited by examiner

MANIPULATOR HAVING A COUNTERWEIGHT DEVICE COMPRISING CANTILEVERED ARMS

The invention relates to a manipulator having a plurality of members that are connected to each other by joints which are adjustable by drives, and a weight equalization device that is assigned to one of the joints and has a rod that is coupled at one end to a first member connected to the joint and is connected at the other end to a spring device that is braced against a seat that is coupled via at least one bearing arrangement to a second member connected to the joint, which includes a first bearing element, and a second bearing element connected to the second member.

EP 0 947 296 B1 describes a spring equalization device that is to be installed between a base and a movable part of a machine or between movable parts of a machine, which device includes a rod, one end of which is to be installed on the base or the movable part of the machine, a retainer plate inside a housing of the device that is attached to the other end of the rod, and two or more springs with different coil diameters that are situated one inside the other around the rod and between the retainer plate and a part that forms a wall of the housing, which part is located on the side of the housing opposite the side on which the retainer plate is located.

The retainer plate is removably attached to the end of the rod, and is formed with a recess in its center that opens in the direction of a part that forms a wall of the device housing, on the side of the latter that is adjacent to the retainer plate, with one end of the rod protruding into the recess and a part provided with threading, which is formed on the protruding end of the rod, being engaged with a nut so that the retainer plate is mounted on the rod, and furthermore, the part that forms the wall of the device housing on the side thereof that forms the retainer plate being designed with a through hole in the center thereof, so that the nut can be operated from outside the device housing through the hole.

EP 1 125 696 B1 describes a device for weight equalization of a robot arm of a robot with a spring cylinder having at least one helical spring, and is distinguished by the fact that at least one device is provided for inserting and removing at least one additional exchangeable helical spring, it being preferably possible to set a pre-tensioning of at least the exchangeable helical spring. This device permits the spring constants of the spring cylinder to be changed, in order to set a desired equilibrant force for equalizing the weight of the robot individually.

The object of the present invention is to create a manipulator with an improved weight equalization device.

The object of the invention is fulfilled by a manipulator having a plurality of members that are connected to each other by joints which are adjustable by drives, and a weight equalization device that is assigned to one of the joints and has a rod that is coupled at one end to a first member connected to the joint and is connected at the other end to a spring device that is braced against a seat that is coupled via at least one bearing arrangement to a second member connected to the joint, which includes a first bearing element, and a second bearing element connected to the second member, wherein the seat is connected to the first bearing element via at least one freely supporting arm.

The term "freely supporting" refers to designs that have a structural element that fulfills its function without additional load-bearing elements. To that end, it should be designed in particular so that all of the functional loads which arise in operation are absorbed solely by the structural element.

According to the invention, this structural element is referred to in general as an arm. The structural element referred to as an arm includes designs that may have for example hollow or solid pressure rods and/or tension rods.

These pressure rods and/or tension rods may be of welded or cast construction, in particular of trussed-frame design. Here the at least one freely supporting arm according to the invention is intended to conduct the forces exerted by the spring device between the first member and the second member of the manipulator from the seat to the first bearing element. These forces, which the spring devices exerts between the first member and the second member of the manipulator, should be conducted in particular completely and without exception via the at least one freely supporting arm according to the invention.

This means that neither a protective cover nor a catching device nor a floor of a pot-shaped housing of the weight equalization device contributes to the transmission of the forces which the spring device exerts between the first member and the second member of the manipulator. As a result, the protective cover, the catching device and/or the floor can be of significantly smaller, lighter and more delicate design than would be necessary if they had to transmit the forces which the spring device exerts between the first member and the second member of the manipulator. As a result, the entire weight equalization device can be of lighter, less expensive and functionally more optimized design. In particular, the at least one freely supporting arm or the freely supporting arms can be optimized in their positions, orientations and dimensioning, with regard to the force flux directions which the spring device exerts between the first member and the second member of the manipulator. So the one freely supporting arm, or the freely supporting arms, may be of trussed-frame, cantilevered or supportive skeleton design.

The one freely supporting arm, or the freely supporting arms, may form in particular an openly accessible component structure, which may have at least one perforation, or a plurality of perforations, through which the spring device is accessible, omitting a protective cover. In this case the spring device of the freely supporting arms may be accessible initially, for example during installation, but may later be inaccessible due to an in particular non-bearing protective cover, in order to provide protection against encroachment in the spring device. In this case the protective cover has a strength, stiffness or wall thickness that is able to prevent manual encroachment, but is too weak to be able to transmit the forces which the spring device exerts between the first member and the second member of the manipulator.

In other words, with the weight equalization device according to the invention, which has one or more freely supporting arms, a separation of the sub-function of power transmission and catch protection from the sub-function of protective cover is achieved. Catch protection serves to prevent springs or spring parts from springing out of the weight equalization device if the rod breaks. The freely supporting arm or arms may be produced for example by welded or cast construction. A skeleton formed in this way may serve in the immediate area of the load path to receive the spring forces and deflect them into the bearing points, i.e. bearing structures, or into the bearing elements. The bearing points in this case may be integrated or installable. Optionally, the bearing structures or bearing elements may also serve to absorb the forces from the catch function in the event of rod breakage.

An addable protective cover in the nature of a hollow body may be provided, independently of the transmission of spring forces. The protective cover may for example be slotted or closed, constructed of a single piece or multiple pieces. Furthermore, a catching element for example in the nature of a cover over additional arms according to the invention may be connected to the bearing structures or bearing elements. The catching element may be open or closed, of flat or contoured design.

A weight equalization device of this sort weighs only a fraction of the weight of known weight equalization devices. Thus it can be handled more easily during processing and installation, and at the same time have the same or even greater strength than the known weight equalization devices. In addition, the protective cover can be fitted or clamped against the skeleton easily with the catching element. The protective cover can be produced very easily and economically, for example from sheet metal or plastic. The protective cover can be designed for example in particular as a one-piece pipe, or from half-shells that are fitted together.

The weight equalization device according to the invention may have a lower weight than the known weight equalization devices, may be produced with low manufacturing costs, and may be handled in a simple manner during installation and operation. At the same time, all sub-functions may be fulfilled without limiting function and safety.

The weight equalization device can be coupled to the second member by means of two opposing bearing arrangements, and the seat can be connected to a first bearing element of each of the two bearing arrangements by means of at least two opposing free supporting arms.

Although the seat may in general be connected to a single first bearing element, for example via a rocker arm provided on one side, it is particularly expedient to couple the weight equalization device to the second member from a plurality of sides, for example from two opposing sides, via two bearing arrangements. In these cases, the seat may be connected with one of two first bearing elements of each of the two bearing arrangements, via at least two opposing freely supporting arms. In this case the seat is held from two sides, so that the seat is kept very stable as part of the entire weight equalization device.

At least one freely supporting arm may be designed as a skeleton component that projects from the first bearing element and branches into at least two sub-arms, whose sub-arms are connected to the seat. The freely supporting structural element referred to as an arm does not absolutely have to be of solid, compact design, but may rather be of a branching or latticed construction. The arm may be designed for example in a trussed-frame or forked shape.

The at least one freely supporting arm may have two sub-arms, which extend in a V-shape enclosing an acute angle, in a plane that is oriented perpendicular to an axis of rotation of the at least one bearing arrangement. Thus two opposing arms attached laterally to the seat may extend from the seat. Each of the two arms may be designed as a V-shaped component, having two sub-arms arranged in an acute angle. In other words, the two sub-arms of each arm may be connected to the seat at a distance from each other, and converge in the direction of the bearing arrangement. Thus the sub-arms come together at the respective first bearing element of the bearing arrangement. It can also be said that the respective sub-arms projecting from the first bearing element of the bearing arrangement extend like spokes in the direction of the seat.

In all embodiments of the invention, the at least one freely supporting arm may be made in a single piece with the seat. The at least one freely supporting arm, or the plurality of freely supporting arms, may be produced for example as cast components in a single piece with the seat. In an alternative configuration, the at least one freely supporting arm, or the plurality of freely supporting arms, may be produced as separate components and welded onto the seat.

In a refinement, an end of the spring device located opposite the seat may be surrounded by a catching device, which is connected to the at least one first bearing element by means of one or more additional freely supporting arms. When a tensile force acts on the rod, the spring device is compressed by means of a spring cup that is connected to the rod. Thus the spring device is held pre-stressed between the spring cup and the seat. In order to prevent unwanted freeing of the spring cup and the spring device suddenly becoming unstressed, in the event of the rod breaking, and being driven explosively out of the weight equalization device, a catching device is situated behind the spring device or spring cup, in order to be able to arrest suddenly unstressed parts of the spring device. To that end, the catching device must be held very firmly. To that end, according to the invention the catching device may be connected to the at least one first bearing element by means of one or more additional freely supporting arms. The freely supporting arms which connect the catching device to the first bearing element may be designed analogous to the arms which connect the seat to the first bearing element. The additional freely supporting arms may extend from the first bearing element opposite the direction of the other freely supporting arms.

The additional arm or additional arms may each have two sub-arms, which extend in a V-shape in a plane oriented perpendicular to an axis of rotation of the bearing arrangement, enclosing an acute angle. The ends of the additional arms that extend away from the first bearing element may end extending in directions parallel to each other. In other words, the additional arms end at the catching device in an orientation perpendicular to the plane of the catching device.

The additional arm or additional arms may be made in a single piece with the seat. The additional arms may be produced for example as a casting, in a single piece with the seat or seat component, including the additional arms. In an alternative configuration, the additional arms may be produced as separate components and welded onto the seat.

In all embodiments of the invention, the rod, together with the spring device, the seat, the at least one bearing arrangement and the at least one freely supporting arm may form a coverless weight equalization device. The coverless weight equalization device may be produced for example as a casting, in a single piece. In an alternative configuration, the coverless weight equalization device may be produced from separate components and welded together.

In all embodiments of the invention, the spring device may be surrounded by a protective cover that is fastened to the weight equalization device, in particular without tension. In other words, in general the weight equalization device can fulfill its function in general without a protective cover. According to the invention, the protective cover serves merely as protection against interference and dust. According to the invention, the protective cover may therefore be of significantly smaller, lighter and more delicate design than would be necessary in order to transmit the forces which the spring device exerts between the first member and the second member of the manipulator. When attaching the protective cover, allowance must be made only for the self-holding force, so that the attaching means may be of correspondingly small and/or light design.

The protective cover may be formed in particular of a sheath made of a plastic, a sheet metal, in particular perforated sheet, an expanded metal, a woven fabric or a net. The protective cover may be formed in this case for example of a tubular sheath made of a plastic, a sheet metal, a perforated sheet, an expanded metal, a woven fabric or a net. The protective cover may be of thin-walled and/or flexible design.

The protective cover may surround the at least one freely supporting arm of the weight equalization device from outside. In this case, the protective cover may be removed without needing to uninstall the weight equalization device. In particular, the protective cover may then be removed from the operationally ready manipulator or installed on the latter, without the weight equalization device having to be removed from the manipulator.

The protective cover may be situated between the spring device and the at least one freely supporting arm of the weight equalization device.

The protective cover may be situated between the spring device and the at least one freely supporting arm of the weight equalization device, enclosing the spring device.

An exemplary embodiment of the invention will be described on the basis of FIG. 1 through 3. The detailed description of this concrete exemplary embodiment also produces additional general features and advantages of the present invention.

Figure 2:
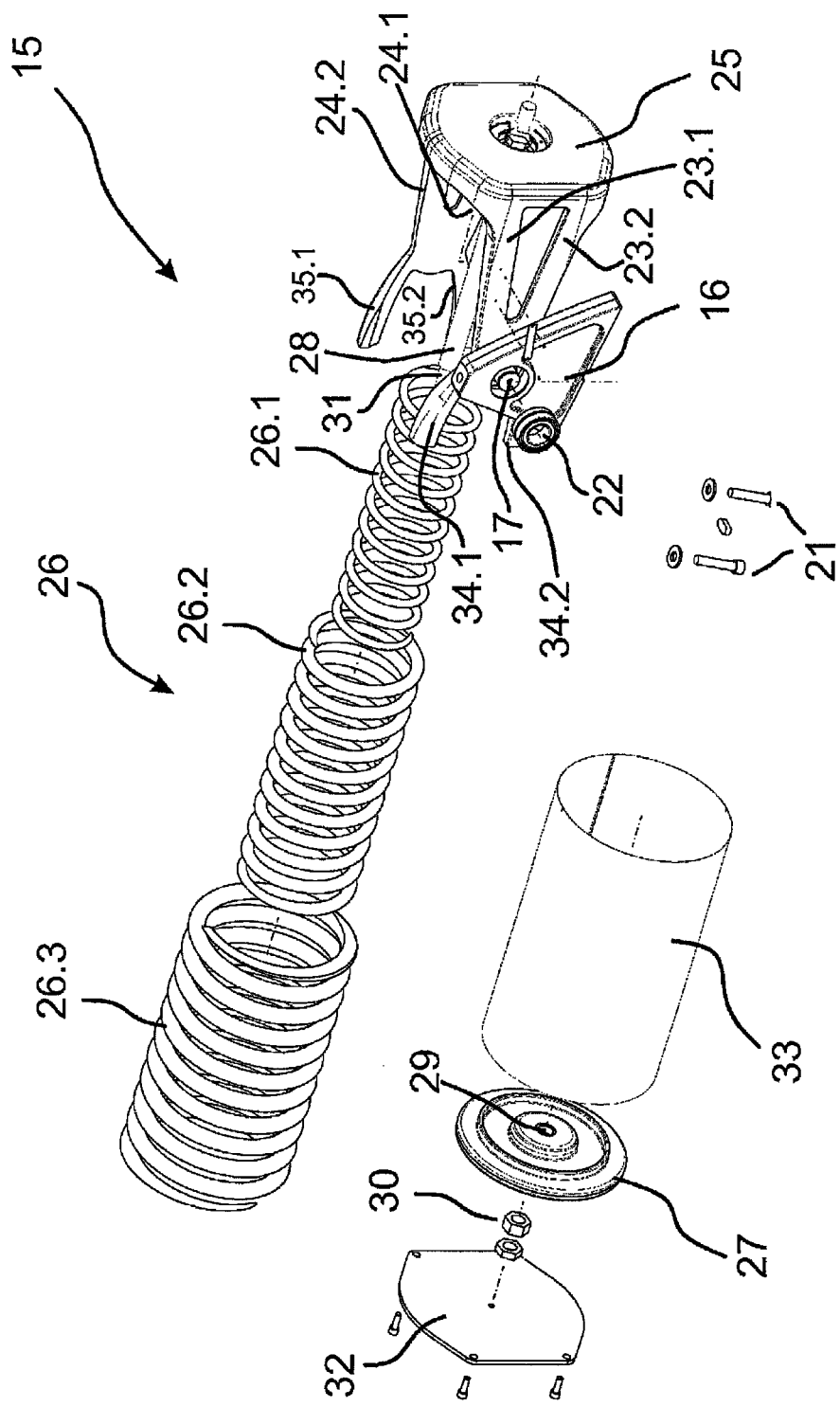
Figure 3:
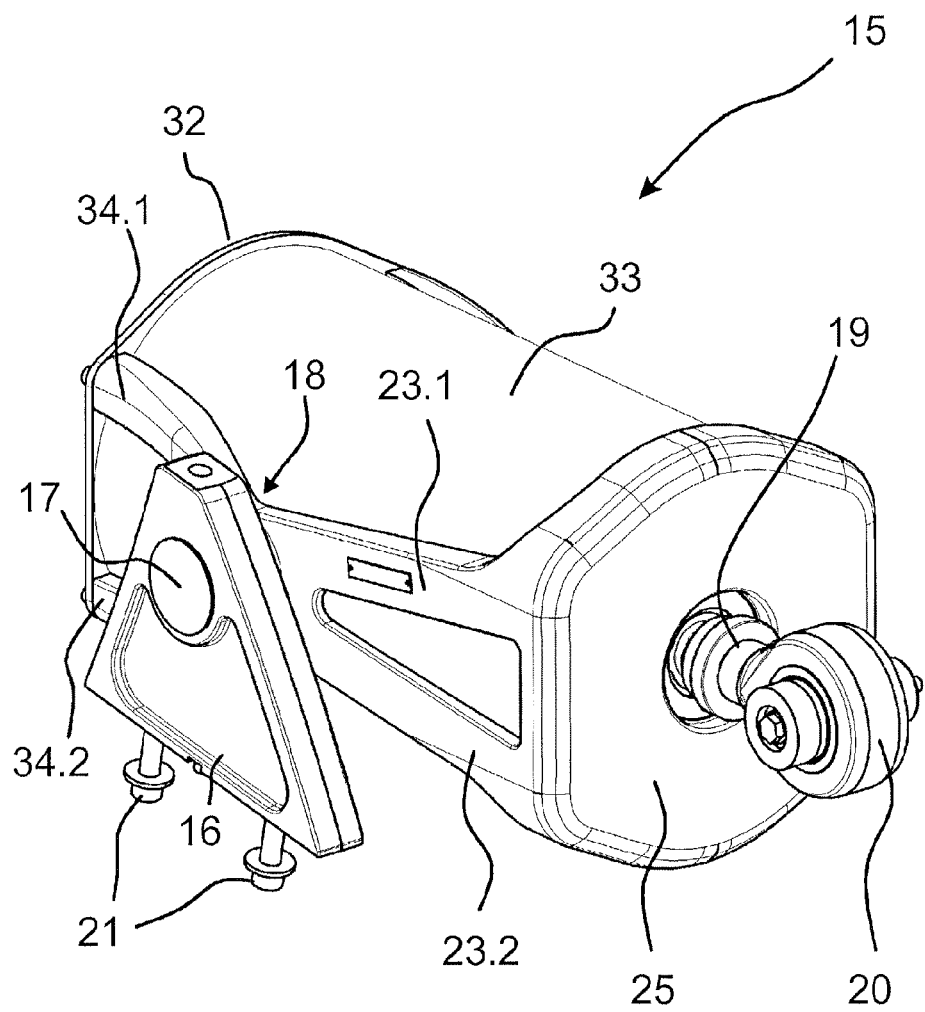

The figures show the following:

FIG. 1 a perspective view of a manipulator having a weight equalization device according to the invention;

FIG. 2 an exploded view of a weight equalization device according to the invention;

FIG. 3 a perspective view of the weight equalization device according to the invention from FIG. 2, in assembled form.

FIG. 1 shows a manipulator 1 having a base frame 2 on which a carousel 3 is supported so that it is rotatable around a first vertical joint A1 and is rotary-driven by means of a first drive motor M1. A motion link 4 is supported on carousel 3 so that it can swivel up and down around a second horizontal joint A2 and is rotary-driven by means of a second drive motor M2. Motion link 4 carries an arm 5, which is supported so that it can swivel up and down around a third horizontal joint A3 and is rotary-driven by means of a third drive motor M3. Provided on arm 5 is a fourth joint A4, which runs in the direction of longitudinal extension of arm 5 and rotary-drives a hand 7 of arm 5 by way of a fourth drive motor. A first leg 8 and a second leg 9 extend backward in a fork from hand 7. The two legs 8 and 9 carry a support for a free end 10 of hand 7. The support defines a fifth joint A5 of manipulator 1, around which hand 7 may be swiveled by means of a fifth drive motor M5. Additionally, hand 7 has a sixth joint A6, in order to be able to rotatably drive an attaching flange 11 by means of a sixth drive motor M6.

In the exemplary embodiment shown, a weight equalization device 15 is situated between carousel 3, which forms a second member 14 of joint A2, and motion link 4, which forms a first member 12 of joint A2. However, weight equalization device 15 may be situated between any two adjacent members of at least one of the joints A1 through A6 of manipulator 1. In order to support weight equalization device 15 rotatably on carousel 3, a second bearing element 16 is connected to carousel 3. A first bearing element 17 is rotatably supported on second bearing component 16. First bearing component 17 and second bearing component 16 form a bearing arrangement 18. A rod 19 of weight equalization device 15 is connected by means of a ball-and-socket joint 20 to motion link 4, i.e., the first member 12 of link A2.

FIG. 2 shows the individual parts of an embodiment according to the invention of weight equalization device 15. By way of representation, a single second bearing element 16 is shown, which is to be attached to carousel 3 in the embodiment according to FIG. 1.

The attachment of second bearing element 16, or of two bearing elements 16, may be accomplished by means of screws 21. Second bearing element 16 is rotatably or pivotably connected to first bearing element 17 via a bearing 22. Two sub-arms 23.1, 23.2 and 24.1, 24.2, respectively, extend from first bearing element 17 toward a seat 25. Three springs 26.1, 26.2 and 26.3 for example are resting against a rear side of seat 25 according to FIG. 2, in the assembled state. Springs 26.1, 26.2 and 26.3 form a spring device 26 in this exemplary embodiment. The rear ends of springs 26.1, 26.2 and 26.3 are supported on a spring cup 27. Spring cup 27 is firmly connected to a rod 28. The connection is made using a hole 29 bored in spring cup 27 and two locking nut 30, which are screwed onto a threaded section 31 of rod 28 together with spring cup 27. Before a catching device 32 is installed, a protective cover 33 according to the invention may be pulled over springs 26.1, 26.2 and 26.3 or spring device 26. Additional freely supporting arms 34 and 35 are provided, in order to attach catching device 32. Additional arm 34 has two additional sub-arms 34.1 and 34.2. Additional arm 35 has two additional sub-arms 35.1 and 35.2. The ends of additional sub-arms 34.1, 34.2, 35.1 and 35.2 form four receiving locations for drilled holes and screws, in order to attach catching device 32. Catching device 32 is thereby connected on the one hand to first bearing element 17, and on the other hand also to seat 25.

Finally, FIG. 3 shows weight equalization device 15 in the assembled state.

The invention claimed is:

1. A robotic manipulator, comprising:
   a first member and a second member actuated by respective drives and coupled for pivotal movement relative to one another by a first pivot joint;
   at least one bearing element on the second member; and
   a weight equalization device between the first and second members, the weight equalization device comprising:
      a rod having a first end and a second end, the first end coupled to the first member,
      a spring seat,
      a spring cup coupled to the second end of the rod,
      at least one spring disposed between the spring cup and the spring seat, the spring biasing the spring cup and the second end of the rod in a direction away from the spring seat, and
      at least one freely supporting arm coupling the spring seat to the at least one bearing element on the second member.

2. The robotic manipulator of claim 1, comprising first and second oppositely disposed bearing elements on the second member, and wherein the weight equalization device comprises first and second oppositely disposed freely supporting arms coupling the spring seat to the first and second bearing elements, respectively.

3. The robotic manipulator of claim 1, wherein the at least one freely supporting arm is a frame member that projects from the first bearing element and divides into at least two branches coupled with the spring seat.

4. The robotic manipulator of claim 1, wherein the at least one freely supporting arm comprises first and second sub-arms separated by an acute angle to define a V-shape in a plane that is perpendicular to an axis of rotation of the at least one bearing element.

5. The robotic manipulator of claim 1, wherein the at least one freely supporting arm comprises a single piece unitary construction with the spring seat.

6. The robotic manipulator of claim 1, further comprising:
   a catch plate proximate the second end of the rod for containing components of the weight equalization device; and at least one second freely supporting arm coupling the catch plate to the at least one bearing element.

7. The robotic manipulator of claim 6, wherein the at least one second freely supporting arm comprises first and second sub-arms separated by an acute angle to define a V-shape in a plane that is perpendicular to an axis of rotation of the at least one bearing element.

8. The robotic manipulator of claim 6, wherein the at least one second freely supporting arm comprises a single piece unitary construction with the spring seat.

9. The robotic manipulator of claim 1, wherein the weight equalization device is operable without a cover enclosing the at least one spring.

10. The robotic manipulator of claim 1, further comprising a non-load bearing cover surrounding the at least one spring.

11. The robotic manipulator of claim 10, wherein the non-load bearing cover comprises a thin-walled tubular sheath.

12. The robotic manipulator of claim 10, wherein the load-free cover surrounds at least a portion of the at least one freely supporting arm.

13. The robotic manipulator of claim 10, wherein the non-load bearing cover is disposed between the at least one freely supporting arm and the at least one spring.

14. A weight equalization device for a robotic manipulator having at least a first member coupled by a first pivot joint to a second member having at least one bearing, the weight equalization device comprising:
 a rod having a first end and a second end, the first end coupled to the first member;
 a spring seat having an aperture, the rod extending through the aperture;
 a spring cup coupled to the second end of the rod;
 at least one spring surrounding the rod and disposed between the spring cup and the spring seat, the spring biasing the spring cup and the second end of the rod in a direction away from the spring seat; and
 at least one freely supporting arm coupling the spring seat to the bearing on the second member.

15. The weight equalization device of claim 14, further comprising a non-load bearing cover surrounding the at least one spring.

* * * * *